United States Patent [19]

Tsuchiya et al.

[11] Patent Number: 4,629,157
[45] Date of Patent: Dec. 16, 1986

[54] REMOTE-CONTROL APPARATUS FOR OPENING OR CLOSING THE VALVE OF CONTAINERS OR THE LIKE

[75] Inventors: Yuji Tsuchiya; Hiroshi Ando, both of Tokyo, Japan

[73] Assignee: Japan Oxygen Co., Ltd., Japan

[21] Appl. No.: 676,884

[22] Filed: Nov. 30, 1984

[30] Foreign Application Priority Data

Dec. 1, 1983 [JP] Japan .................... 58-185963[U]

[51] Int. Cl.⁴ .................................... F16K 35/02
[52] U.S. Cl. ..................................... 251/96; 251/291; 251/292; 137/382.5
[58] Field of Search ............... 251/291, 293, 96, 58, 251/250, 292; 137/382.5; 222/3, 325, 504

[56] References Cited

U.S. PATENT DOCUMENTS

| | | | |
|---|---|---|---|
| 1,287,128 | 12/1918 | Snow | 251/293 |
| 1,410,846 | 3/1922 | Stewart | 251/293 X |
| 3,034,371 | 5/1962 | Cantalupo et al. | 74/423 |
| 3,338,140 | 8/1967 | Sheesley | 92/5 |
| 4,131,133 | 12/1978 | Huwe | 137/624.11 |
| 4,266,320 | 5/1981 | Grant | 16/114 R |
| 4,527,715 | 7/1985 | Rosenbaum | 222/61 |

FOREIGN PATENT DOCUMENTS 794265 4/1958 United Kingdom ............... 251/293

Primary Examiner—James C. Yeung
Assistant Examiner—Allen J. Flanigan
Attorney, Agent, or Firm—Wegner & Bretschneider

[57] ABSTRACT

A remote-control apparatus for opening or closing a container is disclosed, which includes a rotary drive mechansim, an operable shaft driven by the drive mechanism, and a drive wheel mounted on the operable shaft, the drive wheel being held on the operable shaft by a collar. The drive wheel has at one end teeth members which engage notches formed in the peripheral edge of a valve wheel of the container. When the drive mechanism is activated, the operable shaft turns the drive wheel, which causes the valve wheel of the container to turn, thereby causing the valve of the container to either open or close.

2 Claims, 5 Drawing Figures

REMOTE-CONTROL APPARATUS FOR OPENING OR CLOSING THE VALVE OF CONTAINERS OR THE LIKE

FIELD OF THE INVENTION

The present invention relates to a remote-control apparatus for opening or closing the valve of a container and, more specifically, to an apparatus most suited for opening or closing a gas cylinder filled therein with toxic gases such as those used for the production of semiconductor materials in a remote-controlled manner.

BACKGROUND OF THE INVENTION

Gases such as arsine, phosphine, silane, diborane, dichlorosilane, hydrogen chloride, chlorine, etc. are used for the production of semiconductor materials, but, when diffused in the air, these gases are very hazardous in view of their toxicity, ignitability and corrosiveness.

Opening or closing of cylinders containing such gases are carried out by hand, for example, in the replacement thereof. However, there is a fear that the operators may be exposed to them in unexpected accidents such as failure of the caps.

In case of some accidents at places where the aforesaid gases are used or on piping terminating thereat, an emergency shut-off valve is usually mounted in the piping from the gas cylinder to those places to shut off the supply of such gases. However, when a piping trouble arises upstream of the emergency valve, the gases continue to flow out so that the valve of the cylinder should be closed to positively shut off the supply of the gases. Furthermore, even after that trouble is removed, it is advantageous in view of safety that the gases are connected by opening the valve of the cylinder in a remote-controlled manner.

As disclosed in Japanese Tokkaisho Nos. 54-83120 and 57-48358, for instance, the known remote-control apparatus for closing the valve of a high-pressure gas cylinder includes a spindle-rotating member fitted onto a valve spindle, which is designed to be closed by a rachet spanner driven by a compressed gas.

However, this remote-controlled valve closing apparatus is only intended to close the valve of a cylinder, and is used with a chlorine gas cylinder used for the sterilization of service water. This type apparatus is only used and applied to the arrangement wherein the spindle projects above the valve wheel, and is thus inconvenient in that the spindle-rotating member should be removed prior to replacement of the cylinder.

SUMMARY OF THE INVENTION

A main object of the present invention is to provide a remote-control apparatus for opening or closing the valve of a container for gases particularly such as arsine, phosphine, silane, diborane, dichlorosilane, hydrogen chloride, chlorine, etc. used for the production of semiconductor materials, in which the valve of the container, arranged within a housing for isolation, can be opened or closed in a remote-controlled manner rather than manually, and which is very easily attached to or detached from the container during the location, transportation and replacement thereof.

According to the present invention, this object is achieved by the provision of a remote-control apparatus for opening or closing the valve of container, including a rotary driving mechanism, an operable shaft driven by said driving mechanism and a means for engaging the valve (hereafter referred to as a clamp) mounted on said operable shaft, wherein: said operable shaft has at one end a collar for preventing disengagment of said clamp and axially elongate grooves adjacent thereto, and said clamp has therein a through-hole for said operable shaft and finger members engageable within notches formed in the peripheral edge of a valve wheel of said container, said through-hole being provided in the inner wall thereof with axially elongate grooves to be in engagement with the first-mentioned elongate grooves, and said clamp being movably arranged relative to the axis of said operable shaft.

More specifically, the operable shaft is reciprocally rotated by the rotary driving mechanism which is reciprocally rotatable in a remote-controlled manner. The clamp for engaging and locking the valve wheel of the container is fitted over the operable shaft. The operable shaft has at one end a collar for preventing disengagement of the clamp and a number of axially elongage grooves. On the other hand, the clamp has a plurality of pawl members which are engageable within notches formed in the peripheral edge of the valve wheel, and has therein a through-hole through which the operable shaft is inserted. The through-hole is provided in the inner wall thereof with a number of elongate grooves to be in engagement with the first-mentioned grooves. The clamp is moved toward the end of the operable shaft into spline or serration engagement therewith, thereby to engage the valve wheel with the finger members of the clamp. The rotary driving mechanism is driven in a remote-controlled manner to rotate the operable shaft and turn the valve wheel by the finger members of the clamp, whereby the valve is opened or closed. To remove the valve-opening or closing apparatus from the container, the clamp is moved toward the rotary driving mechanism to disengage the finger members of the clamp from the valve wheel and the clamp from the operable shaft. Thus, the replacement and transportation of the container is very easy.

BRIEF DESCRIPTION OF THE DRAWINGS

The foregoing and other objects and features of the present invention will become apparent from the following detailed description with reference to the accompanying drawings, in which.

DETAILED EXPLANATION OF THE INVENTION

Figure 1:
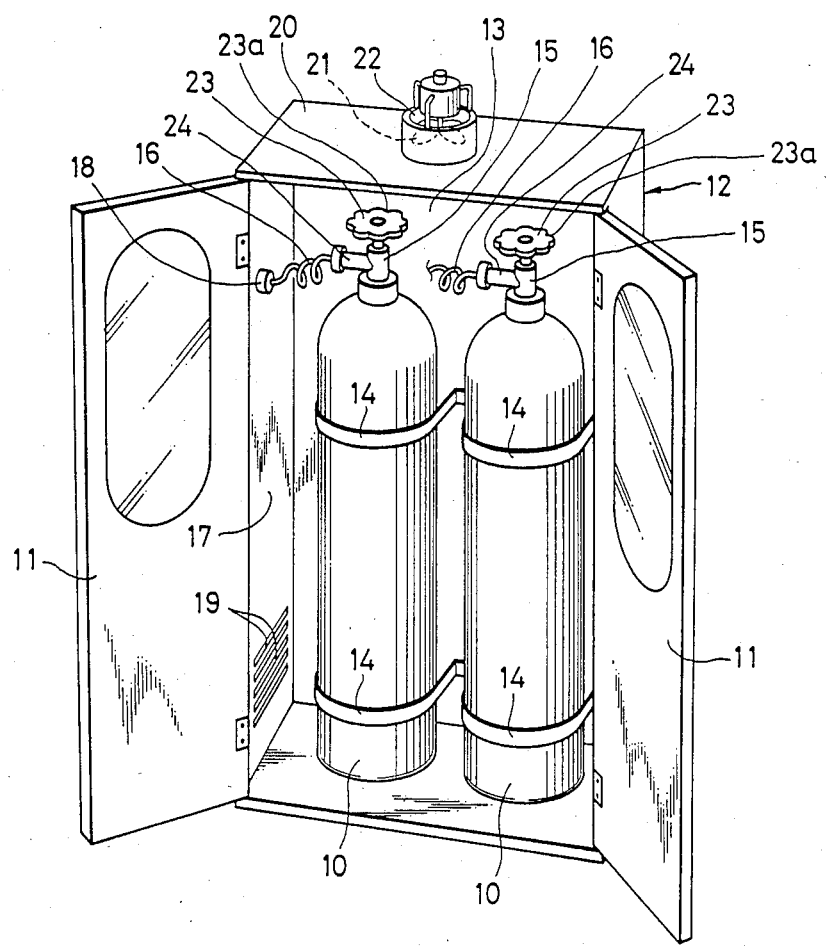
FIG. 1 is a perspective view illustrative of the casing or housing for a gas cylinder.

A cylinder filled with gases such as arsine, phosphine, silane, diborane, dichlorosilane, hydrogen chloride, chlorine, etc. is usually arranged in a casing or housing and isolated from the air so as to prevent the filled gas from diffusing to the air. This will be explained with reference to FIG. 1. A gas cylinder 10 filled therein with a toxic gas is arranged in a casing or housing 12 formed of a steel plate, etc., and provided at the front with doors 11 and 11 for carrying in or out that cylinder. Fastening means 14 such as chains or belts are attached to the rear plate 13 of the housing 12 so as to prevent toppling of the cylinder 10. The gas within the cylinder 10 is supplied through a connection fitting 18 inserted airtightly through, e.g., a side wall 17 of the housing 12 to the user by way of a pipe 16 connected to a metal valve housing cap 15 of the cylinder 10. An air inlet 19 is provided in the lower portion of the side wall of the housing 12, and an air discharge port 22 is formed in a ceiling portion 20, said port 22 being equipped with a ventilating fan 21.

The cylinder 10 filled therein with a gas such as toxic gas is placed in the housing 12, and isolated from the environment by closing the doors 11 and 11. Even when the hazardous toxic gas leaks in this arrangement, it is designed to be arrested in a remover device (not shown) properly engaged within the discharge port 22.

When a hazardous toxic gas is employed by such means, however, opening or closing of a valve (not shown) attached to the cap 15 is still carried out by manual turning of a valve wheel 23, while the doors 11 and 11 remain opened. In consequence, the connection 24 between the cap 15 and the pipe 16 or the cap 15 per se may not be airtight, when the valve is opened or closed by turning of the valve wheel 23. This may result in the leakage of the hazardous toxic gas, to which the operator is directly exposed, and is not only very dangerous, but also causes unwanted diffusion of the gas to the environment. Thus, the isolation of the cylinder 10 from the environment by placing it within the housing 12 does not always assure satisfactory safety. It is preferred to open or close the valve by turning the valve wheel 23 in an unattended, remote-controlled manner, after the doors 11 and 11 have been closed to accommodate the cylinder completely within the housing 12 and isolate it from the outside air.

To this end, the present inventor has accomplished the remote-control apparatus for opening or closing the valve of a container, as shown in FIGS. 2 to 5 inclusive.

Figure 2:
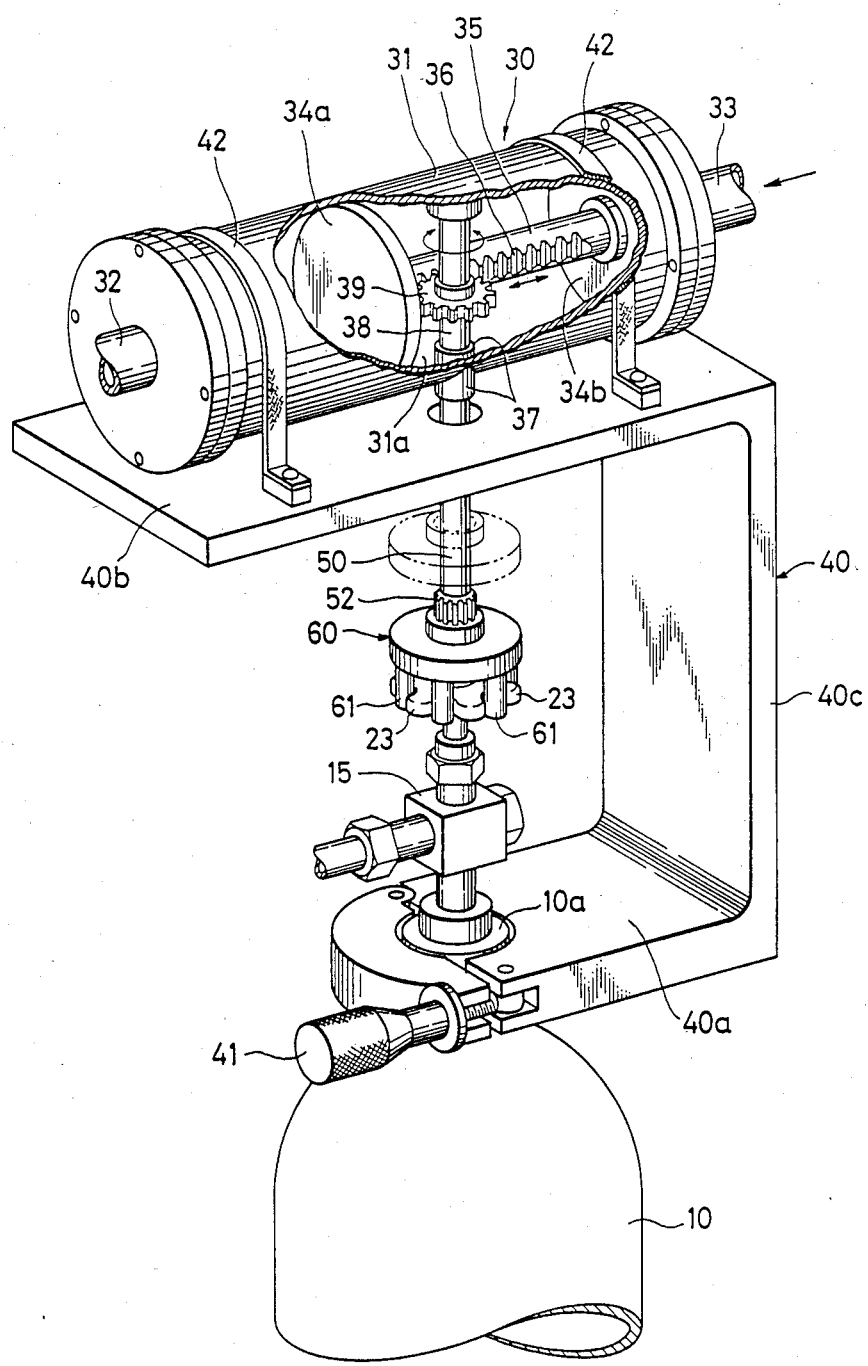
FIG. 2 is a perspective view showing one embodiment of the remote-control apparatus for opening or closing the valve of a container when in use.
Figure 3:
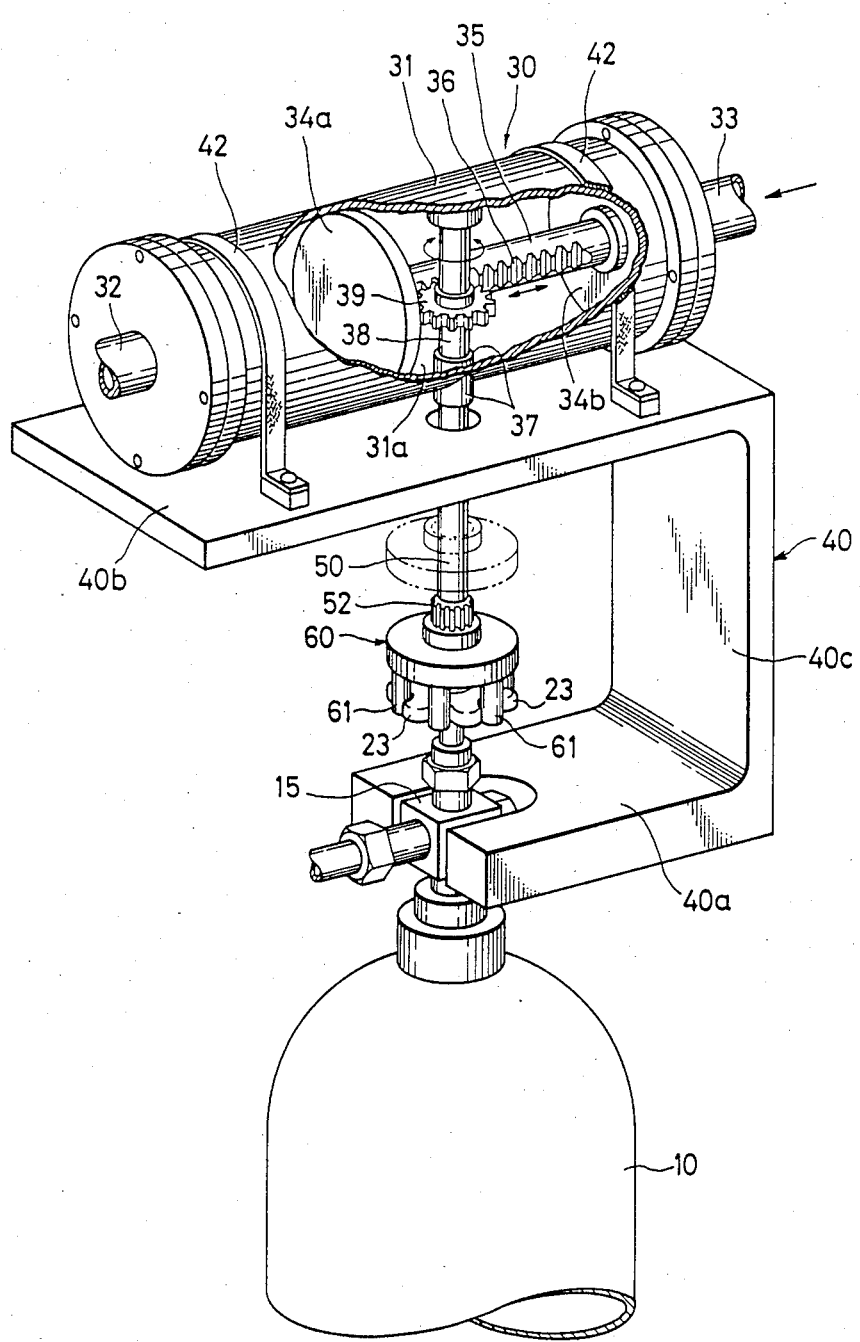
FIG. 3 is a perspective view showing an alternative embodiment of that apparatus when in use.
Figure 4:
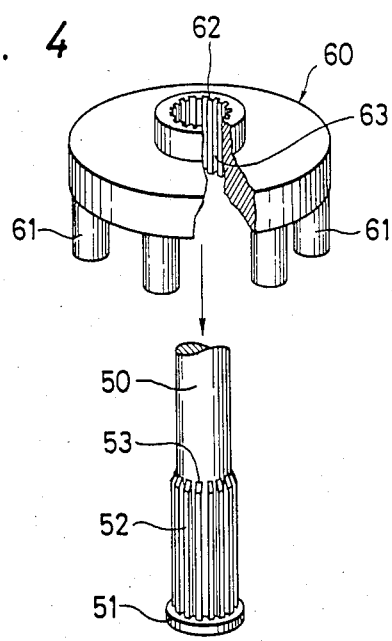
FIG. 4 is an exploded view, partly cut-away, of the operable shaft crank of the remote-control apparatus for opening or closing the valve of a container.

The reciprocally rotary driving mechanism used in the present invention may be of the known types including electric and pneumatic types. In the embodiments as shown in FIGS. 2 and 3, use is made of the rotary driving mechanism 30 of the pneumatic type. As illustrated in FIG. 2, a framework 40 includes a first member 40a to which a cylinder 10 is attached and a second member 40b to which the driving mechanism 30 is attached, said first and second members being integrally joined to each other by means of a connecting plate 40c. The framework 40 is then fixed at the first member 40a into a neck 10a of the cylinder 10 by fastening means 41. Alternatively, the framework 40 is fixed at the first member 40a to a metal cap 15 of the cylinder 10, as illustrated in FIG. 3. The framework 40 may be mounted within the housing 12 by suitable fastening means such as bolts.

The driving mechanism 30 is then fixed on the second member 40b by means of affixing members 42 such as bolts and belts.

The driving mechanism 30 includes a cylindrical body 31 having air inlets 32 and 33 on its both sides. Two pressure-receiving disks 34a and 34b are movably mounted in the body 31 in airtight relation with respect to the inner wall 31a thereof, and are secured to both ends of a connecting rod 35. The disks 34a and 34b are thus disposed within the cylindrical body 31 for horizontal movement. The connecting rod 35 is formed with a rack 36 which is to mesh with a gear wheel 37 fixed to a rotary shaft 38 having one end supported on a bearing 37. An amount of pressurized air is introduced into the pneumatic rotary driving mechanism 30 from the lefthand air inlet 32 to move the disks 34a and 34b in the righthand direction. The result is that the gear wheel 39 in engagement with the rack 36 on the connecting rod 35 rotates clockwise. This clockwise rotation is subsequently transmitted to an operable shaft 50 which is connected at the upper end to the rotary shaft 38.

The operable shaft 50 extends downwardly through the second member 40b and terminates on the valve wheel 23 of the gas cylinder 10. The operable shaft 50 is provided at its lower end with a collar 51 for preventing disengagement of a valve wheel engaging means (hereafter referred to as a clamp) 60, and is formed in a portion adjacent thereto and thereabove with a number of elongate grooves 52 over a length at least corresponding to the thickness of the clamp 60.

The clamp 60 is provided with downward finger members 61 which are engageable within notches 23a (see FIG. 1) formed in the peripheral edge of the valve wheel 23 with a through-hole 62 for the operable shaft 50, which is axially provided in the inner wall with elongate grooves 63 engageable with the grooves 52 in the operable shaft 50.

Figure 5:
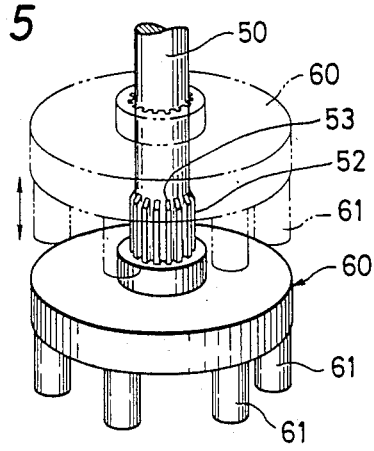
FIG. 5 is a perspective view showing the operating shaft and crank of that apparatus in an assembled state.

The operable shaft 50 is inserted into the through-hole 62 from below the clamp 60 for assembly, as shown in FIG. 5, and is connected at the upper end to the rotary shaft 38 of the rotary driving mechanism 30. When operable shaft 50 is assembled with the clamp 60, the grooves 63 may in some cases not be in engagement with the associated grooves 52. In this case, the clamp 60 does not reach the collar 51 of the operable shaft 50, as illustrated in phantom in FIG. 5, and is rotatably supported on the upper ends 53a of the grooves 52. However, when the clamp 60 moves downward to engage both grooves 52 and 63 with each other, the clamp 60 reaches the collar 51 of the operable shaft 50, so that the shaft 50 and the clamp 60 are in splined or serrated engagement with each other, and rotate together.

The apparatus according to the present invention operates in the following manner.

In FIG. 2 or 3, the supply of pressurized air from the lefthand air inlet 32 is cut off, and is initiated from the righthand air inlet 33. Thereupon, the pressure-receiving disks 34a and 34b move together with the connecting rod 35 in the lefthand direction, so that the gear wheel 39 in mesh with the rack 36 of the connecting rod 35 rotates counterclockwise, and the operable shaft 50 connected thereto through the rotary shaft 38 rotates in the same direction. As a result, the clamp 60 engages the operable shaft 50 in the grooves 52 and 63, and rotates counterclockwise to rotate the valve wheel 23 of the cylinder 10 in the same direction, whereby the valve is opened.

In this state, the pressurized air from the righthand air inlet 33 is cut off, and the supply of pressurized air from the lefthand air inlet 32 is initiated. Thereupon, the pressure-receiving disks 34a and 34b move together with the connecting rod 35 in the righthand direction to rotate the clamp 60 through the rotary shaft 38 and the operable shaft 50 and hence the valve wheel 23 of the cylinder 10 in the righthand direction, whereby the valve is closed.

With the pneumatic type rotary driving mechanism 30, it is thus possible to optionally open or close the valve by supplying pressurized air to either one of the air inlets 32 and 33 of the cylinder body 31 depending upon the rotational direction for opening or closing the valve.

While the foregoing embodiments have been explained with reference to the rotary driving mechanism 30, it is understood that the present invention may make use of other known mechanisms including a remotely-controllable element, such as, for instance, an electric motor.

To remove the apparatus of the present invention from the gas cylinder 10, the clamp 60 is lifted up along the narrow grooves 52 and 63 in engagement, until the bottom face of the clamp 60 is located above the upper ends 53a of the grooves 52 in the operable shaft 50. Thereafter, the clamp 60 is turned to disengage the grooves 63 from the associated grooves 53, so that the clamp 60 is supported on the upper ends 53a of the grooves 52 in the operable shaft 50, as illustrated in phantom in FIG. 5, with the finger members 61 disengaging the associated notches 23a formed in the valve wheel 23. The gas cylinder 10 is separated from the framework 40, and removed from the houseing 12. Then, another cylinder 10 filled with another gas is placed within the housing 12, and is secured to the framework 40. The clamp 60 is rotated to engage the grooves 63 with the associated grooves 52, so that the clamp 60 is guided downwardly. As illustrated by a solid line in FIG. 2 or 3, the finger members 61 of the clamp 60 engage within the notches 23a formed in the valve wheel 23 of the cylinder 10, and the clamp 60 engages with operable shaft 50 through their elongate grooves into one piece. Thus, the replacement of one used-up gas cylinder with another gas cylinder can be achieved in a very simplified manner.

In this manner, it is possible to open or close the valve of the gas cylinder 10 at need by rotating the operable shaft 50 with the use of the rotary driving mechanism 30 in a remote-controlled manner. Therefore, once the apparatus of the present invention is mounted within the housing 12, the valve of the gas cylinder 10 placed in the housing 12 with the doors 11 and 11 being closed for isolation from the environment can be remotely controlled by operating the rotary mechanism 30 from the outside of the housing 12 in an unattended manner.

For further assurance of safety, it is also possible to automatically close the valve of the gas cylinder 10 by allowing the rotary driving mechanism 30 to operate in association with a gas leak or earthquake sensor, when a gas leak or earthquake occurs.

As mentioned above, since the clamp 60 is mounted to the operable shaft 50 for axial movement, and the valve of the cylinder 10 is opened or closed in a controlled manner, opening or closing of the valve of a container filled therein with a very hazardous gas or toxic gas is achieved without operator handling, thus leading to further assurance of safety. The apparatus of the present invention is very easily attached to or detached from the gas cylinder, regardless of the form of the valve wheel used, thus improving further workability.

What is claimed is:

1. A remote-control apparatus for opening or closing a container which includes a valve operated by a valve wheel having notches formed in the peripheral edge thereof, said apparatus comprising:
    (A) a rotary driving mechanism;
    (B) an operable shaft driven by said driving mechanism;
    (C) means for engaging said valve wheel mounted on said operable shaft, said engaging means having a through-hole for receiving said operable shaft, said through-hole having axially elongate grooves in the inner wall thereof;
    (D) said operable shaft being further provided with axially elongate grooves to engage with the first-mentioned elongate grooves, and a collar to prevent disengagement of said engaging means from said operable shaft;
    (E) said engaging means further having fingers extending therefrom to engage said notches;
    (F) said engaging means being axially movable along said operable shaft.

2. The apparatus as claimed in claim 1, in which said rotary driving mechanism is fixed to a framework secured to the neck of the container or a metal valve housing cap thereof.

* * * * *